Figure 1:
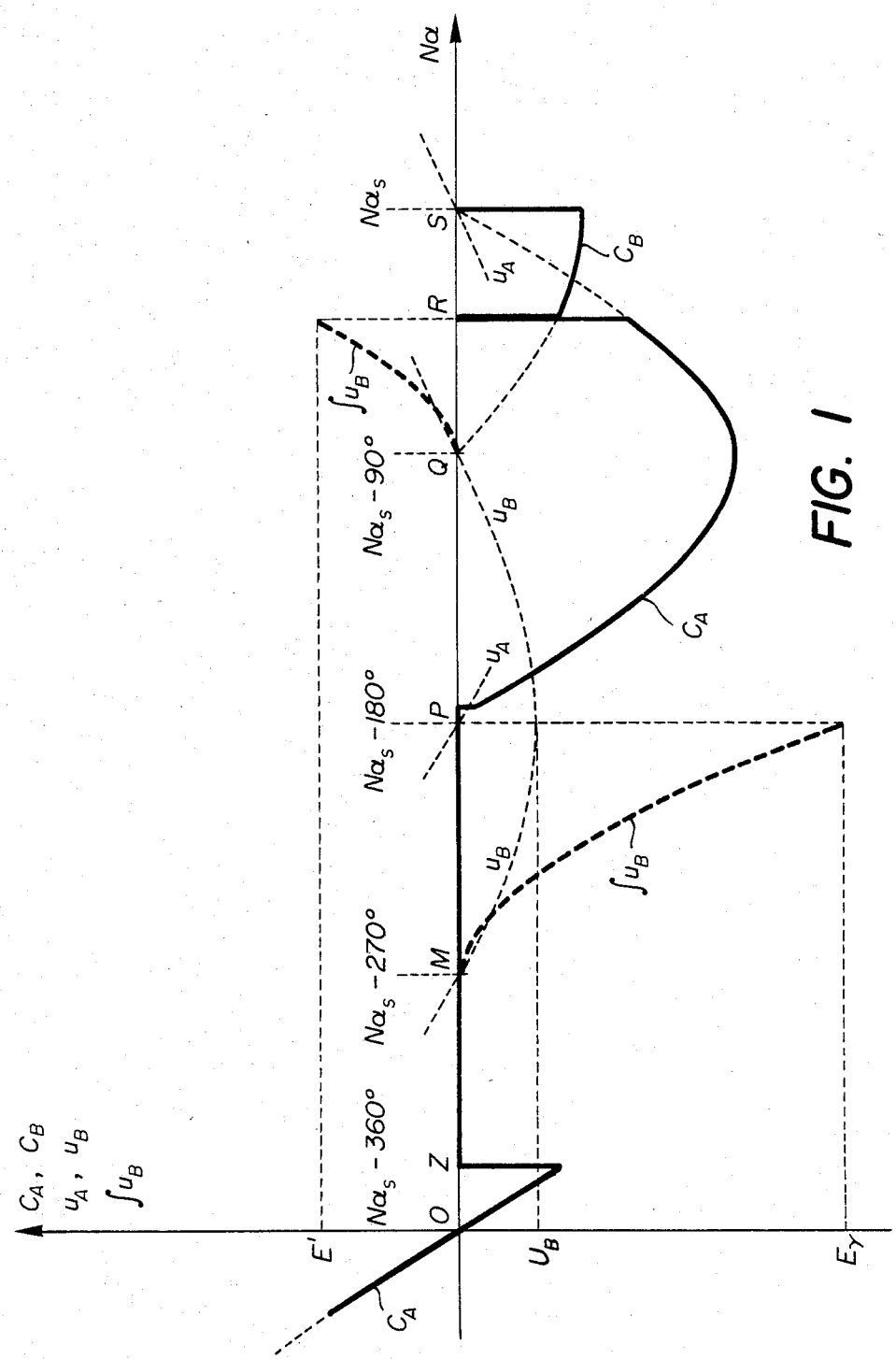

United States Patent [19]

Claude

[11] Patent Number: 4,521,723
[45] Date of Patent: Jun. 4, 1985

[54] METHOD AND DEVICE FOR BRAKING AN ASSEMBLY COMPRISING A TWO-PHASE SYNCHRONOUS MOTOR

[75] Inventor: Oudet Claude, Besançon, France

[73] Assignee: Portescap, La Chaux-de-Fonds, Switzerland

[21] Appl. No.: 596,276

[22] Filed: Apr. 3, 1984

[30] Foreign Application Priority Data

Apr. 7, 1983 [CH] Switzerland .................... 1870/83

[51] Int. Cl.³ .............................................. H02P 8/00
[52] U.S. Cl. ..................... 318/696; 318/138; 318/254; 318/722
[58] Field of Search ............... 318/696, 138, 254, 439, 318/721–723

[56] References Cited

U.S. PATENT DOCUMENTS

| 4,238,717 | 12/1980 | Knight et al. | 318/696 |
| 4,242,624 | 12/1980 | Schalk et al. | 318/696 |
| 4,250,435 | 2/1981 | Alley et al. | 318/696 |
| 4,449,086 | 5/1984 | Hoffmann et al. | 318/696 |

Primary Examiner—David Smith, Jr.
Attorney, Agent, or Firm—Cushman, Darby & Cushman

[57] ABSTRACT

A method is disclosed for braking a two-phase synchronous electric motor of the magnetized rotor type, driving a mechanical device. By this method the current supplied to the electric motor is controlled as a function of the actual position and the actual angular speed of the rotor within the braking period on the basis of information derived from the motor itself without additional detector devices. Perfectly proportioned braking is achieved taking into account individual motor and load characteristics and their possible variation, for example with temperature.

5 Claims, 2 Drawing Figures

METHOD AND DEVICE FOR BRAKING AN ASSEMBLY COMPRISING A TWO-PHASE SYNCHRONOUS MOTOR

The invention relates to a method for braking an assembly comprising a twophase synchronous electric motor and a device driven mechanically by this motor. More particularly, the invention applies to an assembly wherein the load upon the motor is essentially that of inertia, the motor having a rotor magnetized so as to exhibit 2N poles of alternate polarity, N being a whole number, said poles revolving in the airgaps in at least two separate magnetic stator circuits arranged in accordance with the twophase mode of operation, said magnetic circuits being coupled to respective coils connected to a feeding and switching device arranged for feeding said coils with electric current so that the rotor is driven from one rest position to another, each rest position corresponding with a position of equilibrium capable of being maintained by feeding a coil associated with one or other of the phases of the motor.

In numerous applications, especially when the rotor of the motor must carry out successive rotary motions following one another at very short intervals, it is important to achieve braking and damping of the rotor at the end of each rotary motion.

The solutions already proposed for this purpose offer major disadvantages. Mechanical damping by dry or viscous friction, for example, produces braking over the whole of the trajectory and not only at the end of it as desired. Electrical damping by short-circuit of the coils or by a braking pulse or else damping by adjustment of the steepness of deceleration, all have the disadvantage of being very sensitive to variations in temperature and to variation in the characteristics of the motors. It has likewise been proposed to control the current in the motor as a function of the angular position of the rotor determined by an optical coder, but the addition of such an optical coder is relatively costly.

The main object of the invention is to provide a method of braking which does not necessitate any optical detector device, whilst achieving a perfectly proportioned braking over a certain length of travel, and taking into account the characteristics of the motor and its load and especially the variation in these characteristics as a function of the temperature and of manufacturing scatter.

A further object of the invention is to provide a control device for putting into effect the present braking method.

Accordingly, the invention consists of a method and a device comprising respectively the steps and items recited in the appended claims.

Figure 2:
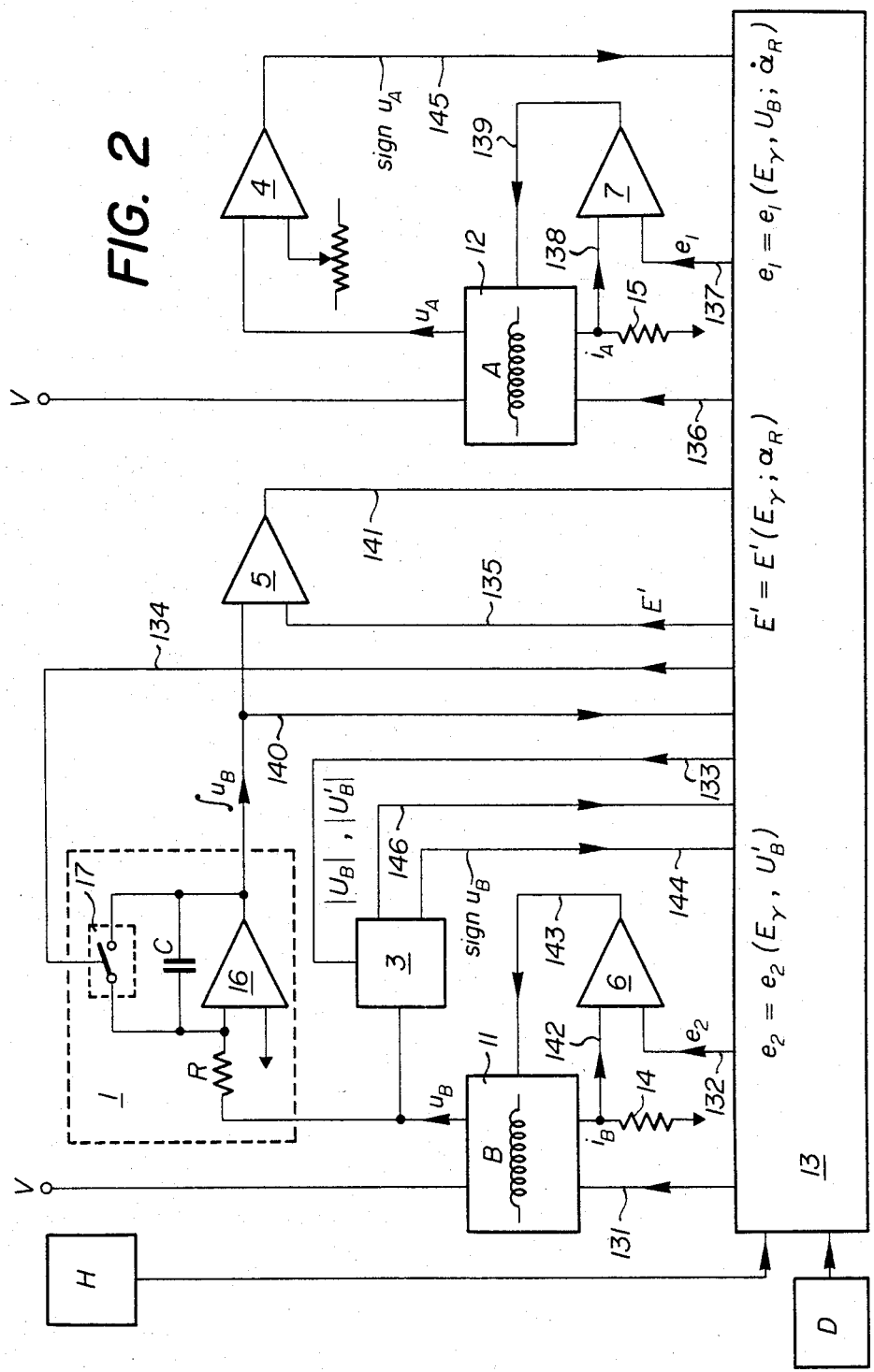

Further characteristics, properties and possibilities of application of the invention will become more clearly evident from the description of an example of implementation and from the explanations given below with respect to the attached drawing in which:

FIG. 1 is a graph showing the variation of certain magnitudes involved in the present method, as a function of the position of the rotor; and FIG. 2 is a general diagram of the control device for putting into effect the method in accordance with the invention.

In a twophase motor of the type mentioned above, which is described, for example, in the U.S. Pat. application Ser. No. 107,640, now U.S. Pat. No. 4,330,727, and in accordance with another embodiment in the U.S. patent application Ser. No. 530,585 the offsetting of the coils of the two phases in quadrature implies that with the velocity of the rotor being assumed constant, the voltage induced in a coil of a first phase is a maximum when the voltage induced in a coil associated with the other phase passes through O. The variation in the induced voltages being essentially sinusoidal as a function of the angle of rotation of the rotor, one may write for phase A: $u_A = \gamma n \dot{\alpha} \sin(N\alpha)$ (1)

and for phase B: $u_B = \gamma n \dot{\alpha} \cos(N\alpha)$ (2)

where $\gamma$ designates the torque per ampere-turn of the coil being considered, n the number of turns in it, $\dot{\alpha} = d\alpha/dt$ the instantaneous angular velocity of the rotor and N the number of pairs of poles on the rotor, $N\alpha$ consequently representing the electrical angle corresponding with the instantaneous position of the rotor.

The angular velocity of the rotor as well as the torque, in particular, may exhibit relatively large variations as a function of the temperature and likewise from one motor to the other in the same manufacturing batch. The characteristics of magnetization, the permeability of the soft iron and the friction are the main sources of variation. The scatter in $\gamma$ from one motor to another may, for example, exceed $\pm 15\%$ and, taking into account the temperature, it must be admitted that the value of $\gamma$ is known only to $\pm 20\%$.

In order to determine the real value of $\gamma$ during the course of operation of the motor, the voltage induced in a coil of the motor, say, e may be integrated by means of an electronic integrator. As such an integrator has the capacitive characteristic C and the resistive characteristic R, integration during a period $[t_1, t_2]$ provides the value:

$$E = \left( \int_{t_1}^{t_2} e \, dt \right) / RC.$$

If one integrates, for example, $u_B$ between an instant $t_1$ at which this induced voltage is passing through O, say, for example, at an electrical angle $N\alpha_1 = 90°$, and an instant $t_2$ such that $N\alpha_2 = N\alpha_1 + 90° = 180°$, the result $E_\gamma$ of this integration becomes:

$$E_\gamma = \left[ \int_{t_1}^{t_2} \gamma n \dot{\alpha} \cos(N\alpha) dt \right] / RC \quad (3)$$

$$= \gamma n \left[ \int_{t_1}^{t_2} (d\alpha/dt) \cos(N\alpha) dt \right] / RC$$

$$= \gamma n \left[ \int_{N\alpha_1}^{N\alpha_2} \cos(N\alpha) d(N\alpha) \right] / NRC$$

$$= -\gamma n / NRC,$$

whence $\gamma = NRC |E_\gamma| / n$.

If the value $U_B$ of the induced voltage $u_B$ is measured at the moment at which the integration ends (that is to say, when $N\alpha = 180°$), one can thus determine $\dot\alpha$ at this moment, namely:

$$\dot\alpha_2 = -U_B/\gamma n = |U_B|/NRC|E\gamma| \qquad (4)$$

On the other hand, a certain angular position $\alpha_3$ may be determined by integrating $u_B$ between one position of the rotor $\alpha_1$ at which this induced voltage passes through O, say, for example, at $270°/N$, and the position $\alpha_3 < \alpha_1 + 90°/N$. The result of this integration E' is namely $$E' = \gamma n \left[ \int_{N\alpha_1}^{N\alpha_3} \cos(N\alpha) d(N\alpha) \right] / NRC \qquad (5)$$

$$= -E\gamma[\sin(N\alpha_3) + 1].$$

Hence by detecting the moment at which the value E' is reached by the integrator, this enables the passage of the rotor through the particular position $\alpha_3$ to be determined.

FIG. 1 illustrates the application of these considerations to the braking of a motor of the above-mentioned type. More particularly, the load on the motor is assumed to be essentially that of inertia, such as is the case in the employment of the motor for driving a printer daisywheel, for example. The friction due to the bearings of the motor and the torque without current are assumed to be very small. Under these conditions the total mechanical energy $W_m$ of the motor-load assembly is limited to the kinetic energy:

$$W_m = J_t \dot\alpha^2/2, \qquad (6)$$

$J_t$ representing the total inertia of this assembly.

Furthermore it should be observed that in the motor concerned here each rest position corresponds with a position of equilibrium which may be maintained by feeding a coil associated with one or other of the phases of the motor.

FIG. 1 shows at least partially the variation as a function of the electrical angle $N\alpha$ of the main magnitudes involved in the braking method described here. This braking is effected during the course of the four last steps of the motor preceding the immobilization of the rotor in an angular position $\alpha_S$ corresponding with the point S on the graph. That is, in accordance with the present method the braking is applied in the event of motions of the rotor which exceed four steps. For motions of four steps or less it is found that in the majority of applications, for example, in the case of the driving of a printer daisywheel, the duration of movement of the other mechanical portions of the system such as the printer carriage become preponderant.

Hence the origin O of the electrical angles $N\alpha$ is located in the graph of FIG. 1 at $N\alpha_S - 360°$, each step corresponding with an electrical angle $N\alpha$ of $90°$.

In the case being considered here by way of example, the driving of the motor is carried out by pulses of constant repetition frequency and the coil or coils of only one phase, A or B, are fed at one and the same time, in the manner well known in this technique (cf., for example, the U.S. patent application Ser. No. 466,542.

FIG. 2 shows the general diagram of the control device for the motor. The coils associated with the phases A and B are connected to respective feeding and switching circuits 11 and 12, which is indicated symbolically in the corresponding blocks in FIG. 2. These circuits 11 and 12 include well-known means of connection and switching, which are shown, for example, in the above-mentioned U.S. patent application Ser. No. 466,542, and in particular they enable the coils of the motor to be connected in a desired sense to a supply voltage V or to circuits for detection and processing of signals, which will be described in greater detail below. The means of connection in particular are arranged in order to carry out the desired connection under the effect of control signals which are supplied to them by a control and data-processing circuit represented by the block 13 in FIG. 2. This circuit includes in particular a micro-processor programmed in accordance with the present method, as will be described below. The control and data-processing circuit is connected to a source of clock signals H and to a triggering device D, the latter providing a triggering and control signal for the number of steps which are to be carried out during a given rotary motion. The cirucit 13 is in particular arranged for controlling the circuits 11 and 12 by way of respective connections 131 and 136, so that the coils are fed with pulses of driving current in accordance with the above-mentioned twophase mode in order to determine the number of steps carried out, and in order to achieve the other functions which will be described below.

In accordance with the present method, during a motion of the rotor corresponding with p > 4 steps the circuit 13 controls the cutting-off of the driving current to the motor from the instant when the state of the cycle of feed corresponds with the control of the advance of the rotor towards the position $\alpha_S - 270°/N$, that is to say, before the current pulse is applied, which is normally intended to make the rotor advance towards the position corresponding with 3 steps before the rest position. The point at which this cutting-off of current occurs is indicated by Z on the axis of the abscissae in FIG. 1, the phase last fed being designated by A and the corresponding torque by $C_A$.

It should be observed that in the present description, the designation by A and B of the phases and respective coils corresponds with the designations in FIG. 1. It is obvious, however, that depending upon the number of steps carried out, phase B can play the part of phase A in the drawing, that is to say, it may be the phase last fed with feed current before the braking operation, so that the designations A and B in the present description and the drawings may simply be interchanged.

In accordance with the diagram of FIG. 1, if the state of feed were maintained, which existed before the cutting-off of the current, the motor would stop finally at the origin O. At the moment of cutting-off, the rotor may be ahead as in the example illustrated in FIG. 1, or behind with respect to the feed cycle and hence it is not exactly known in what position Z it is actually being at the moment when it would normally receive the driving pulse intended to make it advance towards the position corresponding with p − 3 steps. In a stable system, however, the position Z is necessarily located before the point M corresponding with $N\alpha_S - 270°$.

After an interval of time which enables the extinction of the transistory phenomena following the cutting-off of the current at the point Z, the circuits 11 and 12 are controlled from the circuit 13 so as to disconnect the coils. Then, while the rotor continues its travel under its momentum, the coil or coils of phase B are connected under the control of the circuit 13, firstly to an integrator 1 and secondly to a detection circuit 3 which includes an analogue-numerical converter. This circuit 3 is preferably of a type which provides two separate signals for the absolute value and for the sign of the voltage $u_B$ induced in the coil or coils B. The control of this circuit from the circuit 13 is carried out through a connection 133.

The integrator 1 includes an operational amplifier 16 having an input resistance R and a capacitance C connected between its input and output terminals in accordance with the diagram of FIG. 2. In addition, a device for resetting to zero 17 is mounted in parallel with the input and output terminals of the amplifier 16, the device 17 being controlled by way of a connection 134 from the circuit 13.

During the motion of the rotor towards the point M situated at $N\alpha_S-270°$, the integrator is kept out of operation by means of the device 17 and the coil or coils A are connected by means of the device 12 controlled by the circuit 13 to a comparator circuit 4.

When the rotor passes through the point M, the voltage $u_B$ detected by the circuit 3 passes through O, that is to say, it changes sign in the sence indicated. This information, transmitted through a connection 144, "sign $u_B$", to the circuit 13, triggers the putting of the integrator 1 into action by way of a corresponding signal which appears over the connection 134.

The rotor continues its motion beyond M at a velocity which drops only a little during this travel, since the load is essentially that of inertia. The integration of the voltage $u_B$ provides a corresponding signal over a connection 140 to the circuit 13.

Upon passing the point P corresponding with the electrical angle $N\alpha_S-180°$, the voltage $u_A$ changes sign in the sense indicated, which is detected by the circuit 4 which provides a corresponding signal "sign $u_A$" to the circuit 13 over a connection 145. This signal controls the storage in the circuit 13 of the result $E_\gamma$ of the integration of the voltage $u_B$ at this moment, as well as of the absolute value $|U_B|$ of this voltage at the same point P, being an absolute value provided by the circuit 3 over the connection 146. At this instant, the integrator is reset to zero under the effect of a control through the connection 134.

A small interval of time later, the coil or coils of phase A are disconnected from the circuit 4, still under the control of the circuit 13, and are connected to the supply V so as to be traversed by a braking current $i_A$ of constant value $I_A$, which provides a negative torque $C_A$ as shown in FIG. 1. The value of the braking current $I_A$ is determined by a reference signal $e_1$ provided by the circuit 13 over a connection 137 to a comparator 7. The latter receives in addition over a connection 138 a signal representing the actual current $i_A$ in the coil or coils A, a measurement resistor 15 being connected in series with these coils. The comparator 7 provides over a connection 139 an operating signal to the circuit 12 so as to keep the current $i_A$ at the value $I_A$. The reference signal $e_1$ which determines $I_A$ is a function of the values of $E_\gamma$ and of $U_B$ stored in the circuit 13 and depends in addition upon the value $\dot{\alpha}_R$ of the velocity which in accordance with experience the rotor should have in an angular position $\alpha_R$ determined beforehand and lying between $\alpha_S-20°/N$ and $\alpha_S-70°/N$ (the point R in FIG. 1), in order to be able to reach the final position $\alpha_S$, taking into account its real velocity at the point P, its own inertia, its load and frictional torques opposing its rotation.

More particularly in the present example the constant current $I_A$ applied between the points P and R in FIG. 1, P corresponding with the electrical angle $N\alpha_S-180°$, will be determined by the following relationship expressing the equality between the electrical energy of the braking and the reduction in the kinetic energy of the rotor in accordance with (6):

$$I_A \int u_A \, dt = -J_t(\dot{\alpha}^2_p - \dot{\alpha}^2_R)/2$$

duration of the braking or, with (1):

$$I_A \left[ \int_{180°}^{N\alpha_R} \gamma n \sin(N\alpha) d(N\alpha) \right] /N = -J_t(\dot{\alpha}^2_p - \dot{\alpha}^2_R)/2.$$

By introducing the relationships (3) and (4), with $\alpha_2 = \alpha_P$, one obtains:

$$I_A = J_t[U_B^2/(NRCE_\gamma)^2 - \dot{\alpha}_R^2]/2RCE_\gamma \cdot (\cos N\alpha_R + 1)$$

For $N\alpha_R = 315°$, for example:

$$I_A = J_t[U_B^2/(NRCE_\gamma)^2 - \dot{\alpha}_R^2]/3.414RCE_\gamma.$$

The values of $|U_B|$ and of $E_\gamma$ are provided in or converted into numerical values and the microprocessor in the circuit 13 is arranged in order to determine $I_A$ from a table of values, for example, in the form of 16 or 32 discrete current levels represented by corresponding control signals $e_1$.

When the rotor passes through the point Q situated at $N\alpha_S-90°$, the induced voltage $u_B$ changes sign. A corresponding signal appears on the connection 144 and triggers in the control circuit the putting of the integrator 1 into action. The circuit 13 has furthermore determined as a function of the measured value of $E_\gamma$, a reference value $E'$ corresponding with the position $\alpha_R$ of the rotor, in accordance with the relationship (5), with $\alpha_1 = 270°$ and $\alpha_3 = \alpha_R$. This reference value is supplied through a connection 135 to a comparator 5 which receives over another input the output signal from the integrator 1. The comparator 5 thus supplies to the circuit 13 over a connection 141 a position signal indicating the moment when the rotor passes through the point R. This signal triggers the storage in the circuit 13 of the absolute value $|U'_B|$ of the induced voltage $u_B$ supplied by the circuit 3. Secondly, this signal over the connection 141 triggers the command for cutting off the current $I_A$ by way of the circuit 12, and the connection of the coil or coils A to the comparator 4 in order to enable the change of sign of the induced voltage $u_A$ to be revealed, which indicates the passage of the rotor through the position $N\alpha_S$, that is to say, through the point S.

Finally, still following the occurrence of the position signal provided by 5, a new braking phase is triggered. It consists in injecting into the coil or coils of phase B a braking current $i_B$ which will provide a negative torque or braking torque $C_B$ as represented in FIG. 1. The phase B is chosen for this second braking since the torque $C_A$ tends towards O in the vicinity of the point S, whereas the torque $C_B$ reaches its maximum there. Hence the circuit 13 controls the disconnection of the coil or coils of phase B from the circuits 1 and 3 and the feeding of these coils by a current $i_B=I_B=$constant, determined by a reference signal $e_2$. This signal $e_2$ is a function of the stored value of $E_\gamma$ as well as of the value $|U'_B|$ measured at the point R. Thus the current $I_B$ depends upon the actual velocity of the rotor at the start of this new braking phase, which enables the braking to be perfectly adapted to the real conditions of operation of the motor. In practice, the actual velocity of the rotor at the point R may prove to be greater than the velocity which should have been reached by the preceding phase of braking, for example, because of a saturation, or it may be less than this theoretical velocity because of friction greater than foreseen. The value $I_B$ is determined by an empirical function from a table of values including as input values $E_\gamma$ and $U'_B$. The corresponding reference signal is supplied through a connection 132 to a comparator 6 which receives in addition through a connection 142 a signal which is a function of the effective current $i_B$ measured by way of a resistor 14 connected in series with the coil or coils concerned. A connection 143 to the circuit 11 ensures the controlling of the current $i_B$ to the desired value $I_B$.

The value $I_B$ may be determined so that the rotor passes for the first time through S at a very low residual velocity, of the order of 1 to 2 rad/s. By way of example, for a motor carrying out 100 steps per revolution at a speed of 2 rad/s, the time for running through 3° electrical is 0.9 ms, which is compatible with the positional tolerance of ±3° electrical generally demanded in the control of a daisywheel, and with the velocity of release of the striker.

By reaching the point S it is possible to feed again the coil or coils of phase A with current of adequate sign for fixing the position of equilibrium.

Preliminary braking may likewise be provided by means of phase A before the rotor has reached the point P, which allows of higher initial velocity. Such braking would not be adjusted in current level but only in duration from the instant of the rotor passing M, so that phase A is safely available for detecting the passage of the rotor through the point P.

In the present embodiment the braking current has been considered as constant, which may be achieved, for example, by a chopper feeding circuit enabling the current to be controlled whatever the value required, between two limits, and whatever the electromotive force induced. It is, however, equally possible to provide a variable braking current, provided that the same electrical braking energy is generated as in the case of the constant current, during a given interval of time.

I claim:

1. A method for braking an assembly comprising a twophase synchronous electric motor and a device driven mechanically by this motor, the load upon the motor being essentially that of inertia, the motor having a rotor magnetized so as to exhibit 2N poles of alternate polarity, N being a whole number, said poles revolving in the airgaps in at least two separate magnetic stator circuits arranged in accordance with the twophase mode of operation, said magnetic circuits being coupled to respective coils connected to a feeding and switching device arranged for feeding said coils with electric current so that the rotor is driven from one rest position to another, each rest position corresponding with a position of equilibrium capable of being maintained by feeding a coil associated with one or other of the phases of the motor, said method comprising the steps of cutting off the driving current in the coil or coils being fed from the instant when, during the motion of the rotor from a starting position towards a desired position of stoppage corresponding with an angle $\alpha_S$, the state of feed corresponds with the control of the advance of the rotor towards the position $\alpha_S-270°/N$; of integrating the voltage $u_B$ induced in the coil or at least one of the coils associated with one of the phases, say, phase B of the motor, between the moment when it is detected that this voltage $u_B$ is passing for the first time through zero since the said cutting-off of the driving current, and the moment when it is detected that the voltage $u_A$ induced in the coil or at least one of the coils associated with the other phase, say, phase A of the motor, is passing for the first time through zero since the start of the integration of the voltage $u_B$; of storing the result of this integration, $E_\gamma$, as well as the absolute instantaneous value $|U_B|$ of the voltage $u_B$ occuring at the moment when the integration ends, this value defining the velocity of the rotor at this moment; of feeding the coil or at least one of the coils associated with the phase A during the interval between the end of the said integration and the moment at which the rotor reaches a predetermined angular position $\alpha_R$ lying between $\alpha_S-20°/N$ and $\alpha_S-70°/N$, with a braking current $i_A$ such that the angular velocity $\alpha_R$ of the rotor at the time of its passage through said position $\alpha_R$ has a desired value chosen on the basis of its velocity corresponding with the stored value $|U_B|$, its own inertia, its load and frictional torques opposing its rotation, so that the rotor can reach the position $\alpha_S$; of integrating again the voltage $u_B$ induced in the coil or at least one of the coils associated with the phase B, between the moment when $u_B$ is passing for the second time through zero since the said cutting-off of the driving current and the moment when this integral reaches a value corresponding with the angle $\alpha_R$; of measuring the absolute instantaneous value $|U'_B|$ of the voltage $u_B$ at said latter moment; and of then feeding the coil or at least one of the coils associated with the phase B with a braking current $i_B$ determined by an empirical function of the values $E_\gamma$ and $|U'_B|$, this function being chosen so that from experience the rotor at the time of its first passing through the rest position which is to be reached, has a desired residual velocity $\dot{\alpha}_S$ which is very low with respect to $\alpha_R$ or practically zero.

2. A method as claimed in claim 1, wherein the current $i_A$ has a constant value $I_A$.

3. A method as claimed in claims 1 or 2, wherein the current $i_B$ has a constant value $I_B$.

4. A method as claimed in anyone of the preceding claims, wherein the coil or coils associated with phase A are fed with a preliminary braking current during an interval which follows the said cutting-off of the driving current and ends substantially before the moment foreseen for the detection of the said first passing through zero of the voltage $u_A$.

5. A control device for putting into effect the method as claimed in claim 1, which includes feeding and switching circuits for the coils associated with each of the phases of the motor, said circuits being connected to a source of supply voltage, a control and data-processing circuit connected in particular to a source of clock signals and to a triggering device providing a triggering and control signal for the number of steps which are to be carried out, as well as to the feeding and switching circuits for their control, current-detection devices for detecting the value of the current in the coils associated with each of the phases of the motor, first and second comparator devices each connected so as to be controlled firstly by the output signal from a corresponding current-detection device and secondly by a corresponding current reference signal supplied from the said control and data-processing circuit, and so as to supply a current-regulating signal to the corresponding feeding and switching circuit, a first voltage-detection circuit connected to the feeding and switching circuit associated with a first phase of the motor in order to detect at the desired moment a passage through zero of the voltage induced in at least one coil associated with said first phase and connected to the control and data-processing circuit in order to supply it with a corresponding signal, a second voltage-detection circuit connected to the feeding and switching circuit associated with a second phase of the motor in order to detect at the desired moment a passage through zero of the voltage induced in at least one coil associated with said second phase and to measure the absolute value of said induced voltage at instants determined by a measuring control signal, supplied to said second voltage-detection circuit by the control and data-processing circuit, said second voltage-detection circuit being further connected to the control and data-processing circuit in order to supply the same with signals relative to the passage through zero and to the absolute value of the induced voltage, an integrator circuit connected to the feeding and switching circuit associated with said second phase of the motor in order to integrate at the desired moment the voltage induced in at least one coil associated with said second phase, said integrator circuit including a device for resetting to zero, connected to the control and data-processing circuit in order to receive signals controlling the reset to zero, the output of said integrator circuit being connected firstly to the control and data-processing circuit to a first input of a third comparator device, a second input of which is connected to the control and data-processing circuit in order to receive a position reference signal and the output of which is connected to the control and data-processing circuit in order to supply it with a corresponding position-detection signal.

* * * * *

UNITED STATES PATENT AND TRADEMARK OFFICE
CERTIFICATE OF CORRECTION

PATENT NO. : 4,521,723

DATED : June 4, 1985

INVENTOR(S) : Claude Oudet

It is certified that error appears in the above-identified patent and that said Letters Patent is hereby corrected as shown below:

Title page under United States Patent (19) "Claude" should read -- Oudet --.

On the title page inventor should read --(75) Inventor: Claude Oudet --.

Signed and Sealed this

Eighth Day of December, 1987

Attest:

DONALD J. QUIGG

Attesting Officer

Commissioner of Patents and Trademarks